Dec. 4, 1962 D. A. SCHMIDTKE 3,066,991
COLLAPSIBLE AUTO DESK
Filed Jan. 18, 1961 4 Sheets-Sheet 1
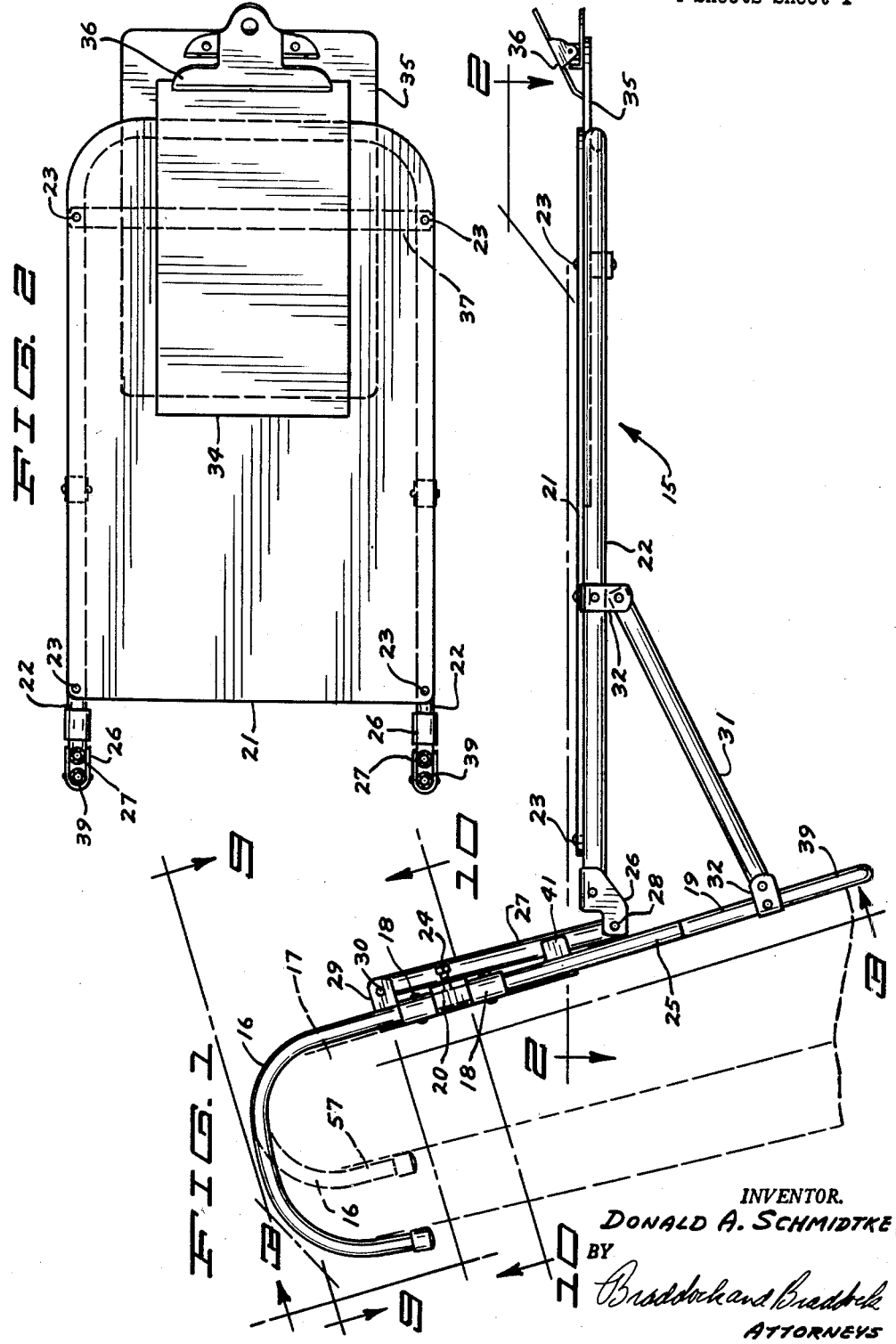
INVENTOR.
DONALD A. SCHMIDTKE
BY
Braddock and Braddock
ATTORNEYS Dec. 4, 1962 D. A. SCHMIDTKE 3,066,991
COLLAPSIBLE AUTO DESK
Filed Jan. 18, 1961 4 Sheets-Sheet 2
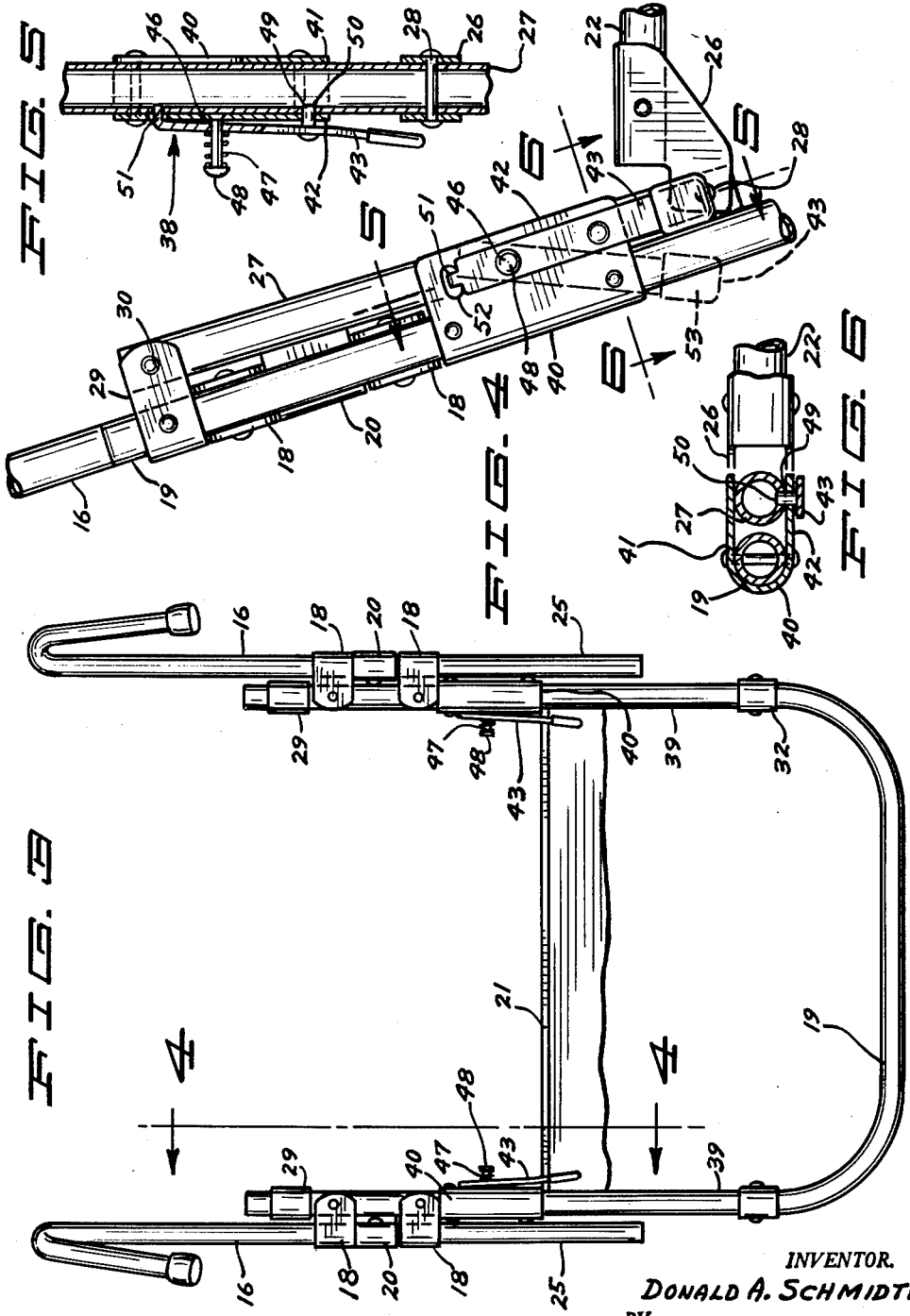
INVENTOR.
DONALD A. SCHMIDTKE
BY
*Braddock and Braddock*
ATTORNEYS Dec. 4, 1962 D. A. SCHMIDTKE 3,066,991
COLLAPSIBLE AUTO DESK
Filed Jan. 18, 1961 4 Sheets-Sheet 3
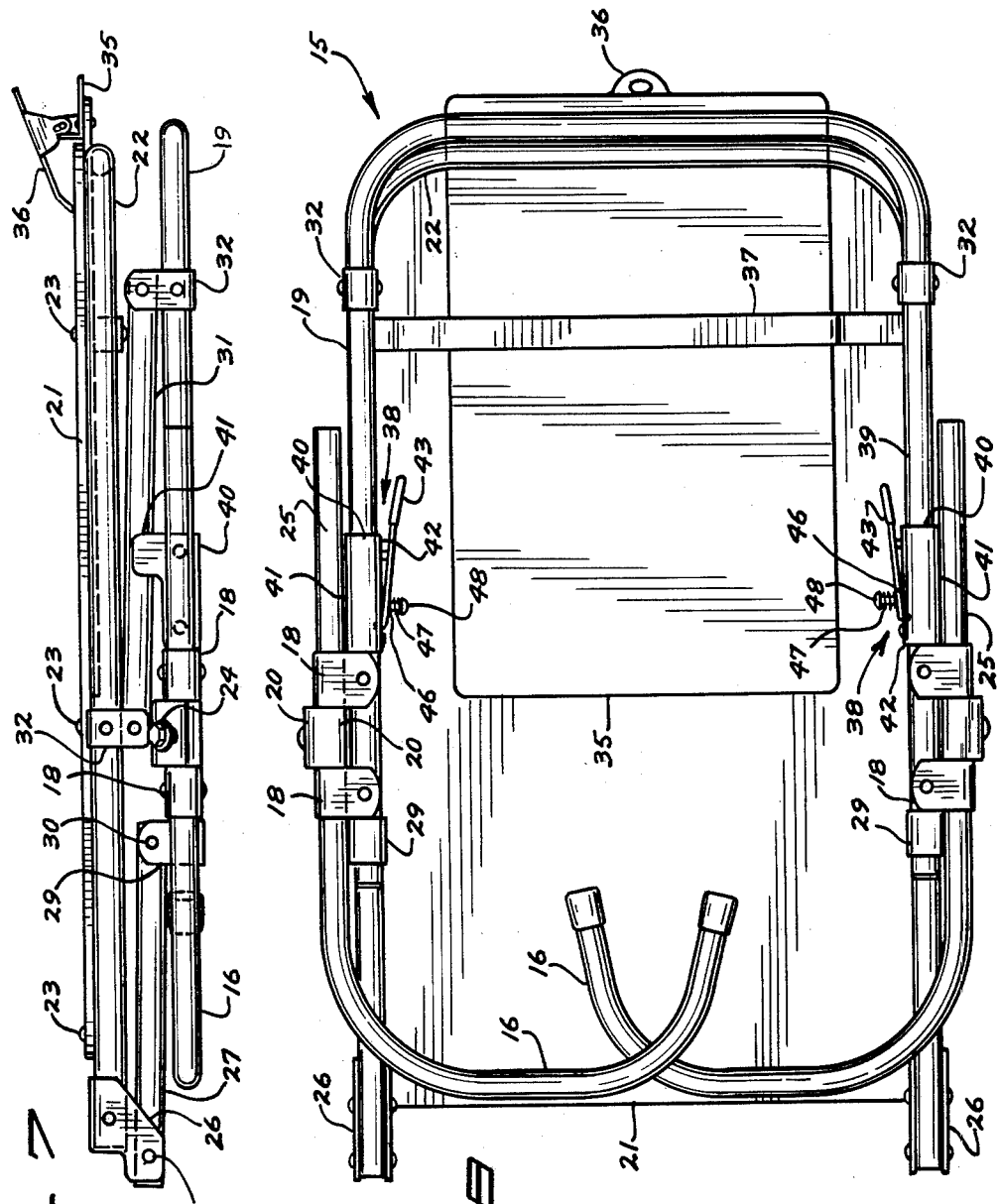
INVENTOR.
DONALD A. SCHMIDTKE
BY
Braddock and Braddock
ATTORNEYS Dec. 4, 1962  D. A. SCHMIDTKE  3,066,991
COLLAPSIBLE AUTO DESK
Filed Jan. 18, 1961  4 Sheets-Sheet 4
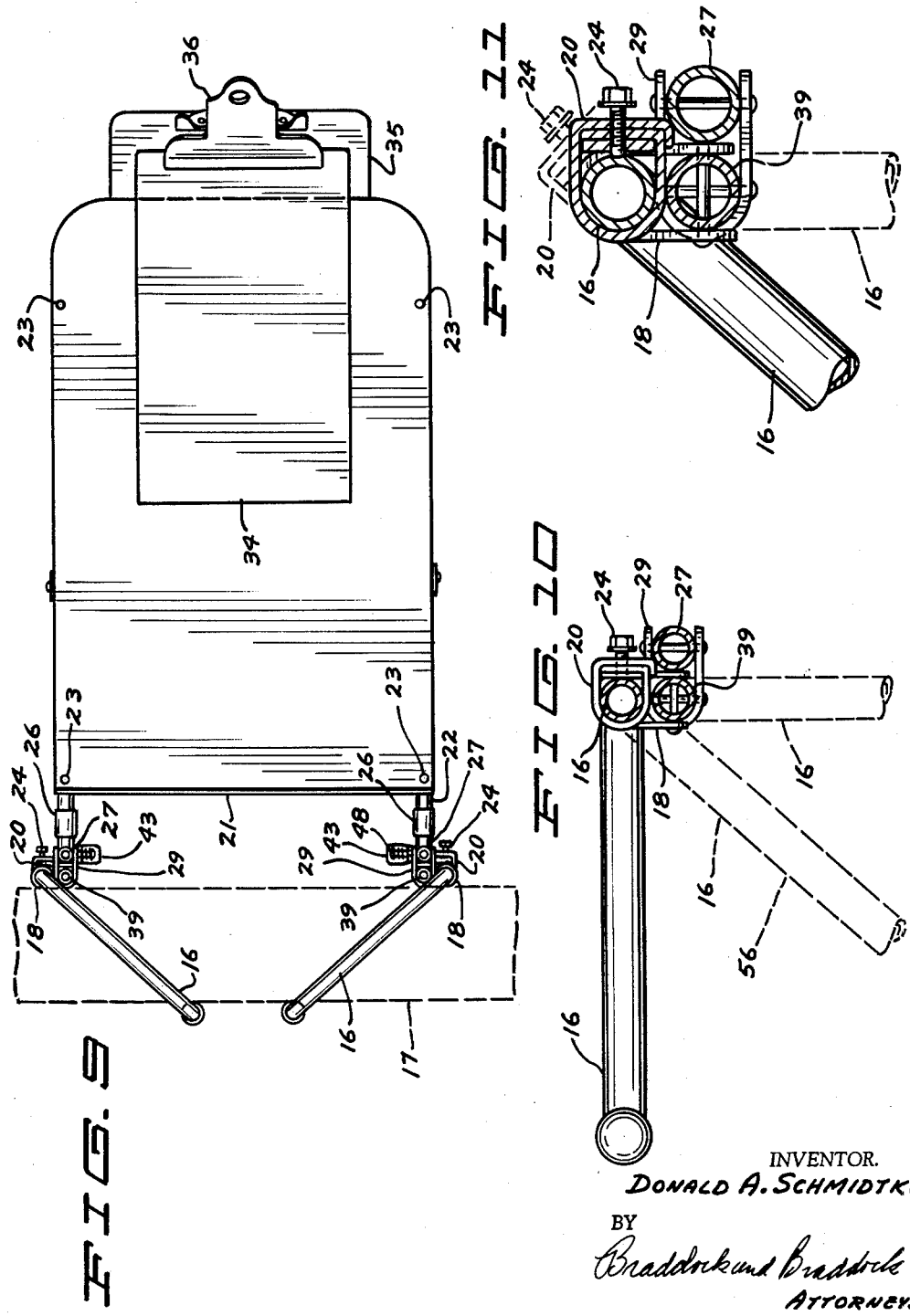
INVENTOR.
DONALD A. SCHMIDTKE
BY
Braddock and Braddock
ATTORNEYS 3,066,991
COLLAPSIBLE AUTO DESK
Donald A. Schmidtke, Waterville, Minn., assignor to Kummeth Manufacturing Company, Owatonna, Minn., a corporation of Minnesota
Filed Jan. 18, 1961, Ser. No. 94,412
3 Claims. (Cl. 311—21)

The present invention has relation to a collapsible desk that may be supported by the back rest of an automobile seat.

The present invention discloses a collapsible auto desk that is readily usable when supported on the back rest of an auto seat. A clip board is positioned to slide with respect to the main top of the collapsible auto desk and serves to extend the writing surface to enable a person to rest his arm while writing. The seat hooks for the desk are adjustable to accommodate back rests of different heights and thicknesses.

In addition the desk folds to be a very compact unit for storage and has means to positively lock it in its usable position.

It is an object of the present invention to present a sturdy, low cost and serviceable collapsible auto desk.

In the drawings:

FIG. 1 is a side elevational view of a collapsible auto desk made according to the present invention shown in its usable position;

FIG. 2 is a sectional view taken as on line 2—2 in FIG. 1;

FIG. 3 is a view taken as on line 3—3 in FIG. 1;

FIG. 4 is a sectional view taken as on line 4—4 in FIG. 3;

FIG. 5 is a sectional view taken as on line 5—5 in FIG. 4;

FIG. 6 is a sectional view taken as on line 6—6 in FIG. 4;

FIG. 7 is a side elevational view of the device of FIG. 1 in its folded position;

FIG. 8 is a bottom plan view of the device of FIG. 7;

FIG. 9 is a view taken as on line 9—9 in FIG. 1;

FIG. 10 is a sectional view taken as on line 10—10 in FIG. 1; and

FIG. 11 is a fragmentary enlarged sectional view taken substantially on the same line as FIG. 10 and illustrating a method of adjusting a seat hook.

Referring to the drawings and numerals of reference thereon, a collapsible auto desk indicated generally at 15 has a pair of seat hooks 16, 16 that have elongated shank portions 25, 25 and are of configuration to fit over the back rest of an automobile seat, indicated in dotted lines as at 17. The seat hooks are each rotatably and slidably mounted in a pair of guides 18, 18 that in turn are fixedly attached to a U-shaped main support member 19 that has two parallel legs 39, 39. A releasable clamp 20 is positioned between each pair of guides 18 and clamps onto the shank of seat hook 16 with a screw 24 and keeps the hook from longitudinally sliding out of the guides but still allows the hook to rotate. The clamp also serves as a stop for limiting the rotational movement of the seat hooks so the hooks may be adjusted to fit narrow back rests.

A desk top 21 is supported on a frame 22 and is fixedly attached to the sides of the frame with a plurality of fastenings 23. A pair of offset brackets 26, 26 are fixedly attached to the inside ends of frame 22 and each bracket has a support link 27 pivotally fastened thereto, as at 28. The support links 27, 27 are each pivotally fastened to a support clip 29, as at 30, and each of the clips 29 in turn is fixedly attached to the main support member 19. The pivot points 30 of the support clips 29 are far enough away from the legs of the main support member so that the support links 27 may each lie parallel to and substantially contiguous to one leg 39 of the U-shaped support member 19. The brackets 26 are offset sufficiently so that when the desk is folded between a first or operative position shown in FIG. 1 and a second or collapsed position shown in FIG. 7, the support links 27 will lie parallel to and contiguous to frame 22.

A pair of braces 31, 31 are each pivotally attached between a pair of brace clips 32, 32 one of which is fixedly attached to a leg 30 of the main support member 19 and the other attached to frame 22 for the desk top 21.

The forward end of desk top 21 is not fastened to the cross members of the frame 22. Sufficient clearance is left to allow a clip board 35 to slip between the desk top and the frame. This clearance can be obtained by flattening the forward portion of frame 22. A spring clip 36 of the board 35 may be used to hold a sheet of paper 34 or other article on the desk top and also may be used to hold the clip board in position when the desk is stored.

The clip board can be removed entirely and used separately from the collapsible auto desk. A clip board guide extends between the two legs of the desk top frame and serves, together with the cross member of the frame 22, to support the clip board.

The extendable clip board greatly increases the utility of the auto desk. The main desk top provides support for the writer's entire forearm with the writing hand positioned near the forward edge of the top. The paper being used may be held by the clip board and the clip board extended as the paper is used. This allows the writer to write on the lower portions of the paper while still using the forward part of the desk top as a support for his paper. The clip board guide holds the board securely so that the clip board itself may be used as a writing surface if desired. This is important if long tally sheets or other long documents are being used by the writer.

A latch mechanism indicated generally at 38 is fixedly attached to each of the legs 39, 39 of the U-shaped main support member 19. The latch mechanism consists of a U-shaped receptacle 40 that is of dimension to receive its associated support link 27 or brace 31 and guide and position the support link or brace. A first leg 41 of each of the receptacles 40 is used to guide its respective brace or support link and a second leg 42 of the receptacle 40 has a detent member 43 that is pivoted to the leg as at 46 and is urged into contact with the leg through the instrumentality of a spring 47 acting through a pin 48. A detent peg 49 extends through a provided hole in leg 42 and engages a hole 50 in its associated support link 27 when the support link is positioned within the receptacle. This serves to lock the collapsible car desk in usable position as shown in FIG. 1. When the desk is to be folded, the detent member of each latch member may be moved to position indicated in dotted lines as at 53 so the detent peg 49 is no longer engaging the hole in its respective support link 27.

*Operation*

When the collapsible auto desk is to be used, it is put into working position as shown in FIG. 1 and the hooks 16 are placed over the back rest of the car seat. Papers or other articles that are to be used may be fastened with the spring clip 36 of clip board 35. The clip board may slide outwardly to provide adequate room for the person doing the writing to rest his arm on the desk top itself and still have the paper supported.

When the collapsible auto desk is to be stored, the dentent members 43 will be moved to position as indicated in dotted lines at 53 in FIG. 4 so that the detent pegs 49, 49 are no longer engaging their respective support links 27, 27. The support links 27, 27 may then be rotated forwardly from the auto seat and as braces 31 are pivoted on both ends the desk top will pivot downwardly and outwardly. The support links 27 are further rotated so that they go over center and the links 27 and the braces 31 will act like legs of a parallelogram so the unit may fold upwardly. As shown in FIG. 7 the braces 31 and the support links 27 fold to position where they are substantially parallel to the legs 39 of the U-shaped main support member 19. The frame 22 for the desk top is also positioned substantially parallel to the support links and the braces 31, 31. The offset brackets 26 are of dimension to allow the support links 27, 27 to lie flat against the frame 22. The respective clips for the braces and support links are of configuration to permit this folding action.

The screw 24 for the releasable clamp 20 may be loosened with respect to the seat hook with which it is associated and may be positioned in any desired angular position. This will provide a stop for the seat hook as the clamp will bear against one of the legs 39 of the main support member 19 and will limit the amount of rotational travel of the seat hook. As shown in FIG. 10 and illustrated in dotted lines at 56 and also as shown in FIGS. 9 and 11, the seat hooks may be positioned at an angle other than 90 degrees with respect to the plane of the main support member 19. This will allow the seat hooks to be clamped firmly onto a back rest that is relatively narrow as in a pickup truck. This is also illustrated in FIG. 1 and the narrow position of the seat hook 16 is indicated in dotted lines at 57. This insures that the main support member 19 will be clamped tightly against the back rest, regardless of the thickness.

The desk can also be vertically adjusted for different back rest heights. The clamps screws 24 may be loosened and the seat hooks slid in the clamps until the desk is at the proper height. The screws may then be retightened and the desk is ready to be used.

What is claimed is:

1. A collapsible desk to be supported by a back rest of a vehicle seat, said desk including a U-shaped main support member having a pair of spaced substantially parallel legs and a cross member joining said legs, a pair of seat hooks each connected to a different one of said legs of said U-shaped support member, a pair of support links each pivotally mounted at a first end thereof with respect to an upper portion of one of said legs of said main support member, a desk top frame pivotally attached to an inner end thereof to second ends of said support links, a pair of braces pivotally attached at first ends thereof with respect to lower portions of said legs of said main support member and at second ends thereof with respect to intermediate portions of said desk top frame, a desk top fixedly attached with respect to said desk top frame, said desk top and frame being movable between a first substantially horizontal position with said seat hooks positioned on a back rest and wherein said pair of support links extend downwardly and a second collapsed position wherein said pair of support links extend upwardly and said pair of support links, said braces, the plane of said main support member and said desk top frame are substantially parallel, and releasable means to hold said desk top frame in said first position.

2. The combination as specified in claim 1 wherein said seat hooks each rotate to lie substantially parallel to the plane of said main support member.

3. A collapsible desk to be supported by the back rest of a vehicle seat, said desk including a U-shaped main support member having a pair of spaced substantially parallel legs and a cross member joining said legs, a pair of seat hooks each having an elongated shank that is rotatably and slidably mounted with respect to one of said legs of said U-shaped support member, first releasable means for preventing sliding movement and for limiting rotational movement of said shanks with respect to said legs, a pair of support links each pivotally mounted at a first end thereof with respect to an upper portion of one of said legs of said main support, a desk top frame having substantially parallel legs and a front cross member, each of said desk top frame legs being pivotally fastened at a first end thereof to a second end of one of said support links, a pair of braces pivotally attached at first ends thereof with respect to lower portions of said legs of said main support member and at second ends thereof with respect to intermediate portions of the legs of said desk top frame, a desk top fixedly attached to an upper side of the legs of said desk top frame, said desk top frame being movable between a first substantially horizontal position with said seat hooks positioned on a back rest and wherein said pair of support links extend downwardly and a second position wherein said pair of support links extend upwardly and said pair of support links, the plane of said main support member, said braces, and said desk top frame are substantially parallel, said seat hooks each being rotatable to a position wherein the plane of the hook is substantially parallel to the plane of said main support member, and second releasable means to hold said desk top frame in said first position.

References Cited in the file of this patent

UNITED STATES PATENTS

| | | |
|---|---|---|
| 1,515,242 | Dexter | Nov. 11, 1924 |
| 1,890,102 | Urguhart | Dec. 6, 1932 |
| 2,749,655 | Ashton | June 12, 1956 |
| 2,799,967 | Molinari | July 23, 1957 |
| 2,921,824 | Richter | Jan. 19, 1960 |

FOREIGN PATENTS

| | | |
|---|---|---|
| 46,423 | Switzerland | Feb. 13, 1909 |
| 318,825 | France | July 7, 1902 |
| 470,122 | France | June 8, 1914 |
| 639,087 | Germany | Nov. 28, 1936 |